United States Patent [19]

Okimoto et al.

[11] Patent Number: 4,952,331

[45] Date of Patent: Aug. 28, 1990

[54] COMPOSITE MAGNETIC COMPACTS AND THEIR FORMING METHODS

[75] Inventors: Kunio Okimoto; Tomio Sato; Toshio Yamakawa, all of Tosu; Nanao Horiishi, Hiroshima, all of Japan

[73] Assignee: Agency of Industrial Science and Technology, Tokyo, Japan

[21] Appl. No.: 3,767

[22] Filed: Jan. 16, 1987

[30] Foreign Application Priority Data

Mar. 10, 1986 [JP] Japan ................................ 61-51754

[51] Int. Cl.[5] ........................ H02K 21/06; C22B 18/04; H01F 1/26

[52] U.S. Cl. .............................. 252/62.54; 252/62.55; 252/62.56; 428/900; 335/302; 335/299; 420/902; 264/DIG. 58

[58] Field of Search ............... 252/62.54, 62.55, 62.56; 420/902; 428/900; 335/299, 302; 264/DIG. 58

[56] References Cited

U.S. PATENT DOCUMENTS

| | | | |
|---|---|---|---|
| 3,864,176 | 2/1975 | Swanson | 148/11.5 SR |
| 3,954,515 | 5/1976 | Swanson | 148/11.5 SR |
| 4,004,167 | 1/1977 | Meckling | 335/302 |
| 4,022,701 | 5/1977 | Sawa et al. | 252/62.54 |
| 4,515,866 | 5/1985 | Okamoto et al. | 501/87 |
| 4,538,151 | 8/1985 | Hatakeyama et al. | 252/62.57 |
| 4,593,333 | 6/1986 | Yanagi | 428/900 |
| 4,708,847 | 11/1987 | Donomoto et al. | 420/129 |

FOREIGN PATENT DOCUMENTS

| | | |
|---|---|---|
| 59-157201 | 9/1984 | Japan . |
| 62-20845 | 1/1987 | Japan . |
| 62-70503 | 4/1987 | Japan . |

*Primary Examiner*—Gary P. Straub
*Attorney, Agent, or Firm*—Oblon, Spivak, McClelland, Maier & Neustadt

[57] ABSTRACT

Composite magnetic compacts having good conductivity and excellent mechanical and magnetic properties and their forming methods. The composite magnetic compacts are basically made by forming mixtures consisting essentially of 1 to 50 percent by weight of a magnetic powder and the remaining percentage of a powder of superplastic Zn-22A1 alloy. A drop in the strength of the compacts that occurs when the mixing percentage of the magnetic powder increases is made up for by the impregration of plastic in the compacts or the simpler addition of a plastic power to the mixture of the powders of magnetic material and superplastic Zn-22A1 alloy. The forming methods of the composite magnetic compacts are carried out at different temperatures and under different conditions depending on the composition of the powder mixtures and so on.

9 Claims, 6 Drawing Sheets

COMPOSITE MAGNETIC COMPACTS AND THEIR FORMING METHODS

BACKGROUND OF THE INVENTION

1. Field of the Invention

This invention relates to methods of forming composite magnetic compacts consisting essentially of a powder of superplastic Zn-22Al alloy, a magnetic powder and a powder of plastic, and more particularly to new composite magnetic compacts having good conductivity and excellent mechanical and magnetic properties and their forming methods.

2. Description of the Prior Art

Magnetic materials can generally be classified into hard magnetic materials having a coercive force of approximately 100 Oe or above and soft magnetic materials having a lower coercive force The former includes ferrite magnet, sintered alnico magnet and rare-metal cobalt magnet which are known as magnet materials. They have wide applications in various kinds of electric appliances, measuring instruments, communications equipment, audio equipment, attracting magnets, toys and the like. Soft magnetic materials are used for transformers, magnetic heads, dampers, electromagnetic wave absorbers and so on.

In recent years, general choices of market has shifted from heavy, thick, long and large products to lighter, thinner, shorter and smaller ones. The same applies to products made of magnetic materials. Demand for products smaller in size, higher in performance and more intricate in profile is increasing. Such demand can be satisfied, for example, by injection-moulding that is applied to such hard magnetic materials as plastic and rubber magnets.

In injection-moulding, a powder of hard magnetic material, such as a powder of ferrite, is mixed and stirred with molten thermoplastic or thermosetting plastic. The mixture is extruded into a mold placed in a magnetic field. After the profile of the mold has been transferred, the compact is cooled to room temperature, and then magnetized in a strong magnetic field. This method permits producing in a single process a compact of intricate profile that is very close to the desired final product in shape and dimension.

But injection-moulding and resins formed thereby have some drawbacks: (1) Serving as insulators, such resins do not prevent electromagnetic interference that has been at issue recently; (2) Losing plasticity on being formed, such resins are practically un-reformable; (3) Such resins must be kept above their melting point while they are being formed, as a consequence of which heating energy constitutes a large percentage of the total energy consumed in forming; (4) Compacts of such resins do not have high toughness; (5) Mold design must allow for the shrinkage of compacts and, therefore, require highly sophisticated skill; and (6) Compacts are likely to have flashes produced thereon as a result of injection-moulding.

Recently, more and more OA (office automation) machines and the like have come to be made of plastic, creating a serious social problem of electromagnetic interference. Therefore, development of effective electromagnetic shielding means has been expected. Another social problem coming up lately is vibration obstacle that also calls for the development of appropriate vibration absorbers and dampers.

SUMMARY OF THE INVENTION

An object of this invention is to provide a new highly conductive composite magnetic compact and its forming method that solve the problems with the conventional injection-moulding process, especially the problem of insulating magnet.

Another object of this invention is to provide a new composite magnetic compact that has not only high conductivity but also high vibration damping and electromagnetic shielding properties and its forming method.

Still another object of this invention is to provide a composite magnetic compact that has wide applications not only as hard magnetic material but also as soft magnetic material suited for electromagnetic absorbers.

Yet another object of this invention is to provide a composite magnetic compact and its forming method that solves the problems with the conventional injection-moulding process through the use of a powder of superplastic Zn-22Al alloy having good conductivity in the forming of magnetic powder.

A further object of this invention is to provide a method of forming a composite magnetic compact that ensures higher forming efficiency than the conventional injection-moulding process by employing pressure-forming that is applied in the production of common sintered powder products.

Still further object of this invention is to provide a composite magnetic compact that is made of a material mixture containing a higher percentage of magnetic powder but retains high enough strength, despite the fact that the use of such a material usually entails a drop in strength, and its forming method.

Another object of this invention is to provide a composite magnetic compact having excellent mechanical and magnetic properties and its forming method.

In order to achieve the above objects, composite magnetic compacts of this invention are made of mixed powders consisting essentially of 1 to 50 percent by weight of a magnetic powder and the remains consisting mainly of a superplastic Zn-22Al alloy powder.

A first method of forming such composite magnetic compact is to form a mixed powder consisting essentially of 1 to 50 percent by weight of a magnetic powder and the remains consisting mainly of a superplastic Zn-22Al alloy powder at a temperature between room temperature and 250° C. and under a pressure of 3 to 60 kgf/mm$^2$. A second method applies hot pressing on the above material powder at a temperature between 200° C. and 250° C. and under a pressure of 1 to 10 kgf/mm$^2$, for a period of 10 to 60 minutes.

The strength of the compact decreases as the ratio of the magnetic powder increases in the mixture. On such occasions, the strength of the compact can be increased by adding plastics to the mixture of a magnetic powder and a powder of superplastic Zn-22Al alloy. Some examples of such plastics are phenol, epoxy, unsaturated polyester and polyurethane resins.

Such resins may be impregnated into a compact made by forming a mixture of a magnetic powder and a powder of superplastic Zn-22Al alloy at a temperature between room temperature and 250° C. and under a pressure of 1 to 30 kgf/mm$^2$. The appropriate amount of impregnated plastics is generally between 1 and 15 percent by weight.

While the above method requires two steps of forming and impregnating, the following methods are much simpler.

A first method is to form a mixture consisting of a powder of superplastic Zn-22Al alloy, a magnetic powder and a powder of plastics at a temperature between 100° C. and 250° C. and under a pressure of 1 to 30 kgf/mm$^2$.

A second method is to hot-press the same mixture at a temperature between 100° C. and 250° C. and under a pressure of 1 to 20 kgf/mm$^2$, for a period of 10 to 60 minutes.

A third method is to fire, at a temperature between 100° C. and 250° C., a compact made by forming the same mixture at room temperature and under a pressure of 1 to 50 kgf/mm$^2$.

As was the case of impregnation mentioned before, such plastic powders as phenol, epoxy, unsaturated polyester and polyurethane resins can be used. The appropriate mixing ratio of such resins is generally between 1 and 15 percent by weight.

In any of the above cases, the formed compact must be magnetized in a strong magnetic field when the magnetic powder is a hard magnetic material.

The powder of superplastic Zn-22Al alloy used in the forming of composite magnetic compacts according to this invention is generally prepared by an air- or argon-atomizing method. The inventor found that the superplasticity of the powder of superplastic Zn-22Al alloy is effectively increased when the powder is quenched in iced water after being heated at a temperature of 380° C. or thereabout for a period of 30 minutes. This knowledge was disclosed in Japanese Provisional Patent Publication No. 157201 of 1984. The strength and density of compacts according to this invention can also be effectively increased if the powder of superplastic Zn-22Al alloy thus quenched is used.

Superplasticity is a property whereby materials elongate extraordinarily under certain conditions, with a sharp drop in resistance to deformation. Metals having this property can be deformed as freely as starch syrup. So, such metals can be formed into products of intricate shapes with a small amount of working force and in a small number of processes. Superplasticity appears when (1) grain size is as fine as about 10 μm and under, (2) grains are equiaxed, (3) grain-boundary slip is likely to occur, and (4) a material consists of a dualphase structure. Thus a fine-grained microstructure is an important prerequisite for the attainment of superplasticity. Therefore, the starting material to reveal superplasticity must preferably be powder, rather than casting. This is because finegrained microstructure cannot be obtained unless molten metal is cooled and solidified rapidly, and faster cooling is achieved with powders that occupy smaller cubic volumes than solid masses (castings). In addition, less segregation occurs in compacts made from powders that are cooled rapidly than in those made from castings.

Zn-22Al alloy is an example of superplastic material that exhibits excellent diffusing and joining properties, vibration damping and electromagnetic shielding effects where the conditions under which superplasticity appears exist.

This invention provides new composite magnetic compacts and their forming methods by taking advantage of the powder forming technique and the superplasticity of Zn-22Al alloy described above.

BRIEF DESCRIPTION OF THE DRAWINGS

FIG. 10 shows the effectiveness of hot-pressing,

FIG. 11 shows the effectiveness of firing for cold-formed compacts, and

FIG. 12 proves the effectiveness of using a quenched powder of superplastic Zn-22Al alloy.

While FIG. 13 shows the influence of forming pressure,

FIG. 14 shows the influence of the mixing percentage of plastic content.

DESCRIPTION OF THE PREFERRED EMBODIMENTS

Figure 1:
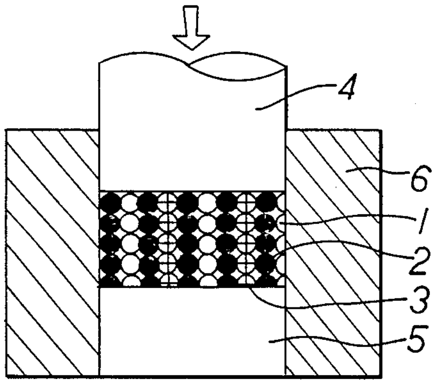
FIG. 1 is a schematic view illustrating an example of forming methods according to this invention.

FIG. 1 schematically shows an example of an apparatus with which a forming method of this invention is carried out. As is illustrated, given amounts of a magnetic powder 1, a powder of superplastic Zn-22Al alloy 2 and a powder of plastic 3 that is added as needed are put in a die 6 and pressed to shape between upper and lower punches 4 and 5 at an appropriately controlled temperature.

Powders of ferrite and rare-earth minerals are good examples of the magnetic powder. Although this invention is applicable to either type, the following description is concerned with embodiments using ferrite powders.

The relationship between the quantities of powders of ferrite and superplastic Zn-22Al alloy mixed together (expressed in terms of percent by weight) is as follows: As the ratio of a ferrite powder increases, compacts will have better magnetic properties but lower strength and formability. Meanwhile, an increase in the ratio of a powder of superplastic Zn-22Al alloy enhances strength, conductivity and formability.

When a powder of plastic is added, compacts will be formed with greater ease and have greater strength as the percentage of the addition increases. But their conductivity and reformability will drop. Accordingly, the appropriate mixing ratio of a plastic powder may be between 1 and 15 percent by weight. The rest may consist of a magnetic powder and a powder of superplastic Zn-22Al alloy.

Figure 2:
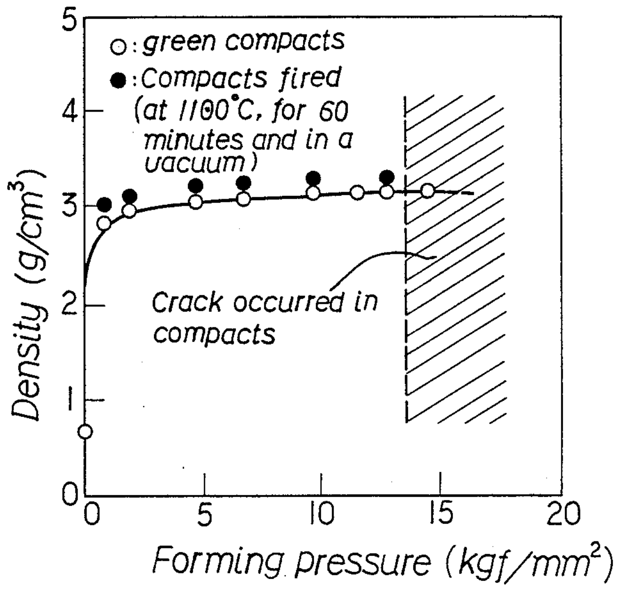
FIG. 2 is a graphical representation of the relationship between the forming pressure and the density of compacts made of ferrite powder.

FIG. 2 shows the relationship between the forming pressure and the density of compacts made by use of a ferrite powder (the GP-500 made by Toda Kogyo Co., Ltd.), together with the density obtained after firing. While the true density of ferrite is approximately 5.2 g/cm$^3$, unfired compacts (green compacts) exhibit a substantially uniform density of 3.0 to 3.1 g/cm$^3$ as indicated by the white dots in the figure. When the forming pressure is increased to about 15 kgf/mm$^2$ or above, the compact fractures into pieces when taken out of the die as a result of the occurrence of lamination cracks. The black dots in FIG. 2 indicate the density of ferrite sinters obtained by sintering compacts in a vacuum at a temperature of 1100° C. for 60 minutes. Cracks occur in some sintered compacts.

As is obvious from the above, magnetic powders, such as those of ferrite, do not have good compressibility and formability. In press-forming a ferrite powder by the closed-die forming method employing a metal die, the compact may fracture when taken out of the die because of the spring-back of the compact or the friction between it and the die. Even if the fracture at this point is avoided, the compact may still break while it is being delivered to firing, magnetizing and other subsequent processes or as a result of thermal expansion during firing.

This invention solves the above problems by making composite compacts through the use of a mixture of a magnetic powder and a powder of superplastic Zn-22Al alloy. The powder of superplastic Zn-22Al alloy is used like a binder. The resulting composite magnetic compacts have excellent plasticity, conductivity, vibration damping and electromagnetic shielding properties, and good formability and workability.

Figure 3:
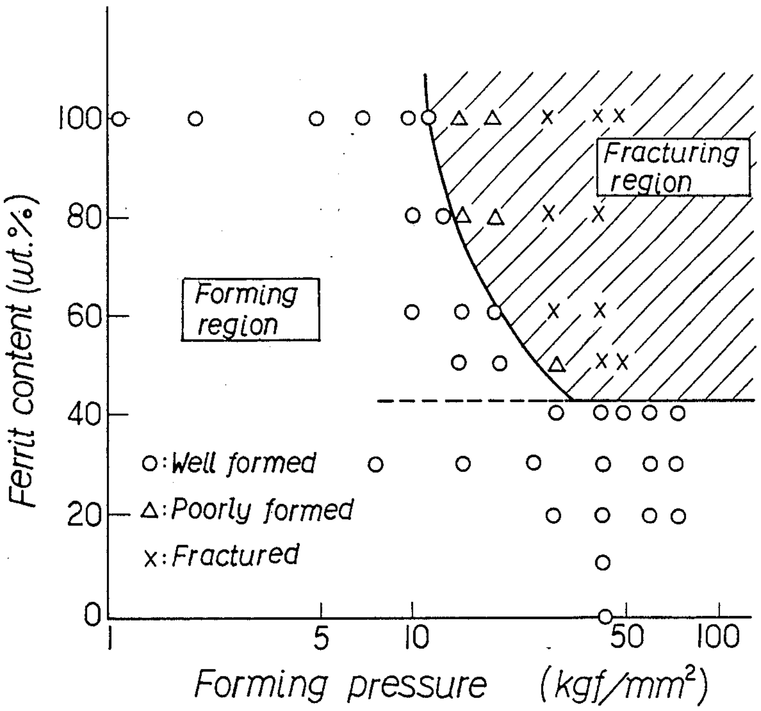
FIGS. 3 and 4 respectively show the forming and fracture regions of cold- and hot-formed compacts.
Figure 4:
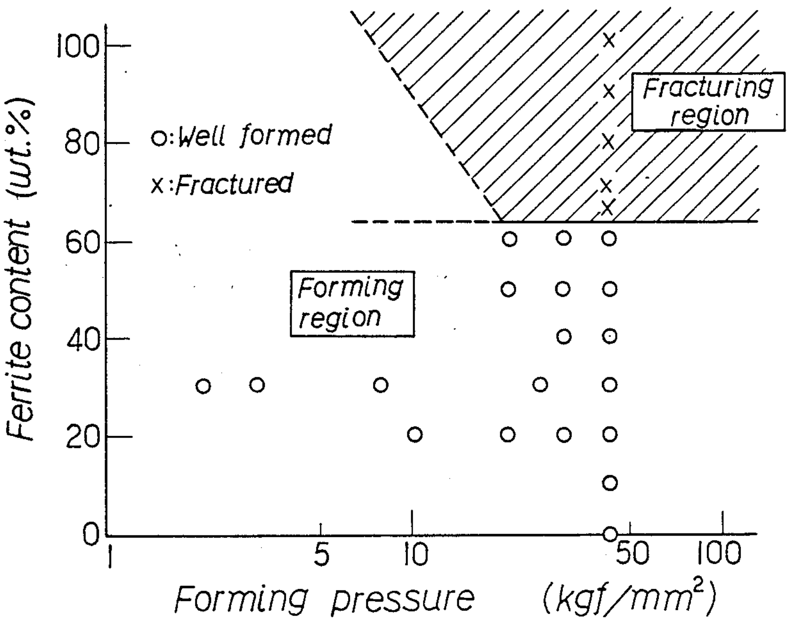
Figure 5:
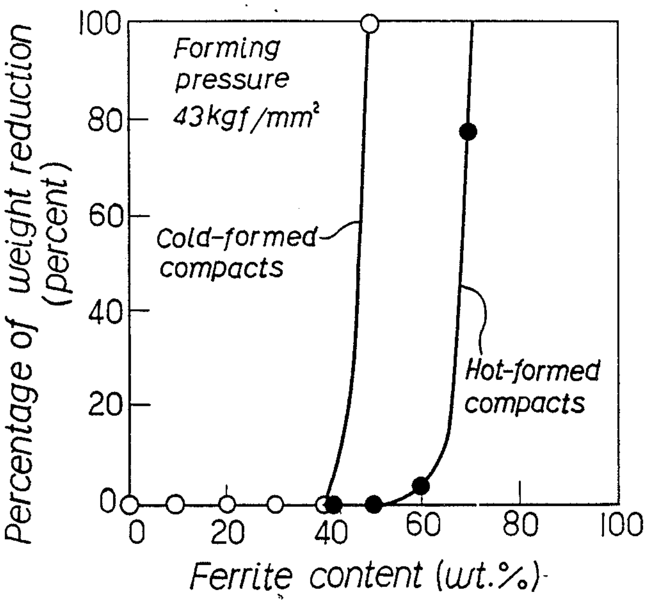
FIG. 5 is a graphical representation of the results of rattler tests conducted on different compacts.

FIG. 3 shows the formed condition of compacts taken out of dies which are cold-formed under different pressures and with different percentages of ferrite addition. FIG. 4 shows the similar condition of hot-formed compacts (made at 250° C.) FIG. 5 graphically shows the strength of compacts measured by the "Rattler Test on Compacts of Metal Powders" specified in JSPM (the Japan Powder Metal Association) Standard 4-69. Judging from the results shown in FIGS. 3 to 5, the maximum mixing percentage of a ferrite content that assures good formability and such compact strength as will keep the weight reduction under the Rattler test at 10 percent or under is 60 percent by weight. But, considering the strength of the compact and other requriements, the appropriate mixing percentage becomes 50 percent by weight or under. With soft magnetic materials, the mixing percentage of the magnetic powder may be 20 to 30 percent by weight maximum.

Figure 6:
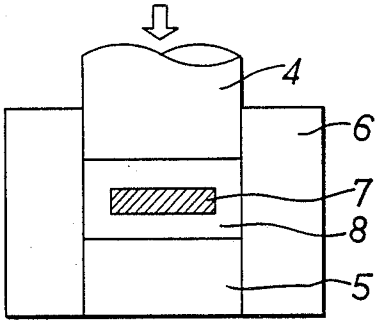
FIG. 6 is a schematic view illustrating another example of forming methods according to this invention.

This invention is applicable to dispersed composite compacts obtained by mixing a ferrite powder with a powder of superplastic Zn-22Al alloy as shown in FIG. 1. It has also proved applicable to compacts in which a core of ferrite powder or casting (an ordinary material having a density of 100 percent) bulk 7 is buried in the center of said dispersed composite compacts or a compacts of a superplastic Zn-22Al alloy powder as shown in FIG. 6. In this instance, the magnetic material need not be a powder or casting of ferrite, but a powder or casting of rare-earth minerals.

With regard to the forming conditions, the forming temperature, forming pressure and duration of time in which such pressure is applied are the major factors. It is most important to choose an appropriate forming temperature because superplastic materials undergoes a larger ductility and a sharp drop in pressing force at certain temperatures. A temperature between 200° C. and 250° C., especially in the vicinity of 250° C., is appropriate for the powders of superplastic Zn-22Al alloys, though they exhibit sufficient ductility even at room temperature. When the forming pressure is too low, the powder fails to solidify or, even when it solidifies, fails to form strong enough compacts.

Figure 7:
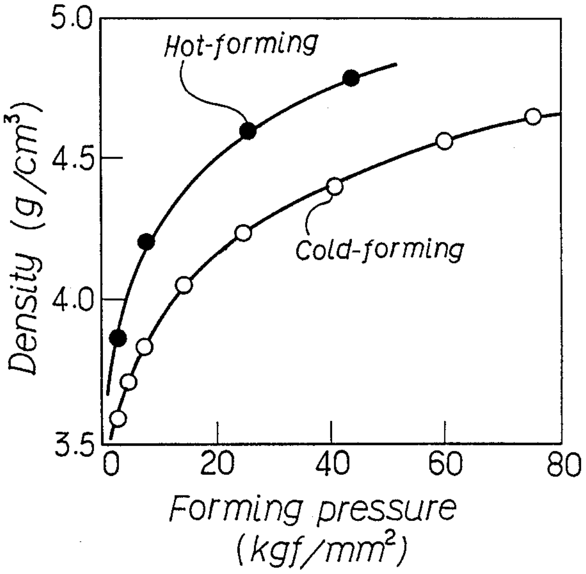
FIG. 7 is a graphical representation of the relationship between the forming pressure and the density of compacts made from a material in which 30 percent by weight of ferrite powder is mixed.

FIG. 7 shows the relationship between the density and forming pressure of compacts formed cold and at a temperature of 250° C. Here, 30 percent by weight of a ferrite powder is mixed with a powder of superplastic Zn-22Al alloy. A forming pressure of approximately 3 kgf/mm$^2$ is sufficient when forming is done at a temperature of about 250° C. using a mechanical or hydraulic press. Even if the forming pressure is increased beyond a required level, mechanical properties of compacts are not improved much because of the limited compressibility of the ferrite powder. Rather, there will arise the risk of breaking the forming die. As such, the higher limit of forming pressure may be about 60 kgf/mm$^2$ even with cold-forming which needs a considerably large pressing force. The pressing force may be applied only momentarily as with forging on a mechanical press. But application of pressure over a longer period, which may be achieved by means of hot pressing, is effective in attaining higher densities as shown in Table 1 below.

TABLE 1

| Forming Pressure | Hot Pressing | Hot Forming |
|---|---|---|
| 1.0 kgf/mm$^2$ | 3.59 g/cm$^3$ | 3.41 g/cm$^3$ |
| 2.1 kgf/mm$^2$ | 3.86 g/cm$^3$ | 3.65 g/cm$^3$ |
| 3.2 kgf/mm$^2$ | 4.07 g/cm$^3$ | 3.87 g/cm$^3$ |

[Conditions] Mixing ratio of ferrite powder: 30 percent by weight (constant)
Hot pressing: 30 minutes at 250° C.
Hot forming (Hot forging): 1 minute at 250° C.

As a consequence, the pressing force can be reduced to between 1 and 10 kgf/mm$^2$. With superplastic Zn-22Al alloys, however, superplasticity drops as a result of the coasening of grain size when they are allowed to stand at a temperature of 250° C. for a period longer than about 60 minutes.

Accordingly, the maximum duration of pressure application in hot pressing is set at 60 minutes.

When the magnetic powder is of the soft type, the products made under the above conditions are soft-magnetic composite compacts. When the magnetic powder is of the hard magnetic type, the products made under the above conditions are hard-magnetic composite compacts after magnetizing process. Still greater effect is obtained if a mixture of powders of hard ferrite and superplastic Zn-22Al alloy is formed in a magnetic field in which magneitsm can be oriented.

Firing the formed compact at a temperature between 250° C. and 350° C. provides further enhancement of strength. But such firing can safely be dispensed with.

Figure 8:
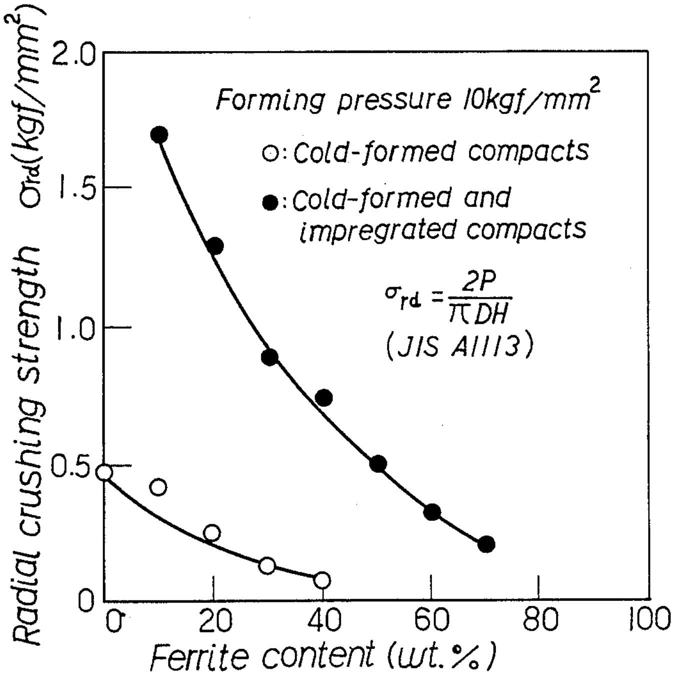
FIG. 8 graphically shows the relationship between the strength of compacts and the mixing percentage of ferrite content.

As is shown in FIG. 3, the strength of compacts decreases as the percentage of magnetic material in the mixture increases. With a view to improving the strength of such compacts, a compact made from a mixture of a ferrite powder and a powder of superplastic Zn-22Al alloy is placed in a hermetically sealed container. After evacuating the container with a rotary pump, thermosetting epoxy resin (the 27-770 made by Kasai Shoko Co., Ltd.) was impregnated in the compact. The obtained results are given in FIG. 8 which shows the relationship between the mixing ratio of ferrite and the strength of compacts formed under a pressure of 10 $kgf/mm^2$. Obviously, the impregnation remarkably improves the strength of the compacts.

The forming conditions of pre-impregnated compacts are the same as those described before. But since plastic is to be impregnated later, the forming pressure need not be excessively large. A pressure of 2.5 to 5.0 $kgf/mm^2$ is sufficient when forming is done at a temperature of 250° C. or thereabout. The pressure may be between 1 and 30 $kgf/mm^2$ in cold forming.

When the magnetic powder is of the hard magnetic type, the products formed under the above conditions are turned into strong composite magnetic compacts by the subsequent plastic impregnation and magnetization in a strong magnetic field. Still greater effect is obtained since the magnetism can be oriented by forming the mixture in a magnetic field.

Firing a pre-impregnated compact at a temperature between 200° C. and 400° C. brings about an improvement in strength. But such firing may safely be omitted since a remarkable improvement in strength can be achieved by impregnation.

Instead of impregnating plastic in formed compacts, a mixture of powders of ferrite, superplastic Zn-22Al alloy and plastic may be formed under such conditions as will be described in the following.

Of various factors involved in forming, such as the forming temperature and pressure and the duration of time over which such forming pressure is applied, the forming temperature is most important, especially when the plastic powder is of the thermosetting type as in the case of an example to be described later. The appropriate temperature range is between about 100° C. at which the thermosetting property of plastic appears and about 250° C. at which the superplasticity of Zn-22Al alloy appears. The appropriate forming pressure is 1 to 30 $kgf/mm^2$ in hot forming (foring) at a temperature between 100° C. and 250° C., between 1 and 20 $kgf/mm^2$ in hot pressing, and between 1 and 50 $kgf/mm^2$ in cold forming (forging).

Although cold forming is generally not appropriate when the plastic powder is of the thermosetting type, the strength of such cold-formed compacts can be improved by heating at a temperature between 100° C. and 250° C. at which the thermosetting property of such plastic appears. But a choise of plastic suited for cold forming is preferable.

When the magnetic powder is of the hard magnetic type, the products formed under the above conditions turn into strong compacts on being magnetized in a strong magnetic field. Still greater effect is obtained if a mixture of powders of ferrite, superplastic Zn-22Al alloy and plastic is formed in a magnetic field in which magnetism can be oriented.

Now some examples of this invention will be given in the following.

EXAMPLE 1

Compacts were cold formed under a constant pressure of 44 $kgf/mm^2$ from mixtures of a powder of ferrite (the GP-500 made by Toda Kogyo Co., Ltd.) and a powder of superplastic Zn-22Al alloy, with the mixing percentage of the ferrite powder varied between 10 and 40 percent by weight. Magnetic properties of the obtained compacts are shown in Table 2.

TABLE 2

| Mixing Ratio of Ferrite Powder | Magnetic Properties of Compacts: Residual Magnetic Flux Density Br | Coercive Force Hc | Maximum Energy Product (HB) |
|---|---|---|---|
| 10 wt. % | 230 g | 220 Oe | 0.0127 MGOe |
| 20 | 400 | 390 | 0.039 |
| 30 | 600 | 560 | 0.084 |
| 40 | 770 | 700 | 0.135 |

EXAMPLE 2

Compacts were hot formed at a temperature of 250° C. under a constant pressure of 44 $kgf/mm^2$ from mixtures of a powder of ferrite (the GP-500 made by Toda Kogyo Co., Ltd.) and a powder of superplastic Zn-22Al alloy, with the mixing percentage of the ferrite powder varied between 10 and 60 percent by weight. Magnetic properties of the obtained compacts are shown in Table 3.

TABLE 3

| Mixing Ratio of Ferrite Powder | Magnetic Properties of Compacts: Residual Magnetic Flux Density Br | Coercive Force Hc | Maximum Energy Product (HB) |
|---|---|---|---|
| 10 wt. % | 200 G | 200 Oe | 0.010 MGOe |
| 20 | 410 | 390 | 0.040 |
| 30 | 610 | 560 | 0.085 |
| 40 | 780 | 700 | 0.137 |
| 50 | 930 | 830 | 0.193 |
| 60 | 1090 | 940 | 0.256 |

EXAMPLE 3

Compacts were cold formed from a mixture of a powder of ferrite (the GP-500 made by Toda Kogyo Co., Ltd.) and a powder of superplastic Zn-22Al alloy, in which the mixing percentage of the ferrite powder was fixed at 30 percent by weight, with the forming pressure varied. Magnetic properties of the obtained compacts are shown in Table 4.

TABLE 4

| Forming Pressure | Magnetic Properties of Compacts: Residual Magnetic Flux Density Br | Coercive Force Hc | Maximum Energy Product (HB) |
|---|---|---|---|
| 75 $kgf/mm^2$ | 610 G | 560 Oe | 0.085 MGOe |
| 60 | 610 | 560 | 0.085 |
| 25 | 570 | 550 | 0.078 |
| 15 | 540 | 520 | 0.070 |
| 7.5 | 540 | 500 | 0.068 |

EXAMPLE 4

In addition to the hard-magnetic compacts described so far, vibration damping effects of soft-magnetic composite compacts were also investigated. The SR-5 of Toda Kogyo Co., Ltd. was used as a magnetic powder, which was mixed with a quenched Zn-22Al superplastic powder. The mixing percentage of the magnetic powder was varied between 0 and 30 percent by weight. The compacts were formed at a temperature of 240° C. and under a pressure of 20 $kgf/mm^2$. Damping capacities of the obtained compacts are shown in Table 5.

TABLE 5

| Forming Conditions | | | |
|---|---|---|---|
| Mixing Ratio of Ferrite Powder | Powder of Superplastic Zn-22Al alloy | Forming Temperature | Damping Capacity $\eta = Q^{-1}$ |
| 0 wt. % | Quenched | 240° C. | 0.008 ~ 0.01 |
| 10 | Quenched | 240 | 0.008 ~ 0.01 |
| 20 | Quenched | 240 | 0.008 ~ 0.01 |
| 30 | Quenched | 240 | 0.008 ~ 0.01 |

EXAMPLE 5

Compacts were cold-formed under a constant pressure of 10 kgf/mm$^2$ from mixtures of a powder of ferrite (the GP-500 made by Toda Kogyo Co., Ltd.) and a powder of superplastic Zn-22Al alloy, with the mixing percentage of the ferrite powder varied between 10 and 100 percent by weight. Then, an epoxy resin (the 27-770 made by Kasai Shoko Co., Ltd.) was impregnated in the formed compacts. Magnetic properties of the obtained hard-magnetic composite compacts are shown in Table 6.

TABLE 6

| | Magnetic Properties of Compacts | | |
|---|---|---|---|
| Mixing Ratio of Ferrite Powder | Residual Magnetic Flux Density Br | Coercive Force Hc | Maximum Energy Product (HB) |
| 10 wt. % | 170 G | 215 Oe | 0.01 MGOe |
| 20 | 350 | 500 | 0.04 |
| 30 | 520 | 480 | 0.06 |
| 40 | 680 | 630 | 0.10 |
| 50 | 830 | 730 | 0.15 |
| 60 | 980 | 880 | 0.22 |
| 70 | 1090 | 970 | 0.26 |
| 80 | 1220 | 1050 | 0.33 |
| 90 | 1340 | 1130 | 0.38 |
| 100 | 1430 | 1210 | 0.45 |

EXAMPLE 6

Mixtures of magnetic powders (the SR-5 and MZ-100 made by Toda Kogyo Co., Ltd.), 0 and 20 percent by weight, were mixed with a powder of superplastic Zn-22Al alloy and formed into compacts at room temperature under a constant pressure of 10 kgf/mm$^2$. The same epoxy resin as was used in Example 5 was impregnated into the formed compacts. Damping capacities of the obtained soft-magnetic composite compacts for vibration damping services are shown in Table 7.

TABLE 7

| Forming Conditions | | |
|---|---|---|
| Mixing Ratio of Magnetic Powder | Type of Magnetic Powder | Damping Capacity $\eta = Q^{-1}$ |
| 0 wt. % | — | 0.01 |
| 20 | SR-5 | 0.05 |
| 20 | MZ-100 | 0.05 |

EXAMPLE 7

In the following examples, an air-atomized powder of not larger than 44 μm in grain size was used as a powder of superplastic Zn-22Al alloy, the GP-500 of Toda Kogyo Co., Ltd. as a powder of ferrite, and a powder of black phenol resin (the 21-111) of Kasai Shoko Co., Ltd., not larger than 840 μm in grain size, as a powder of plastic.

Figure 9A:
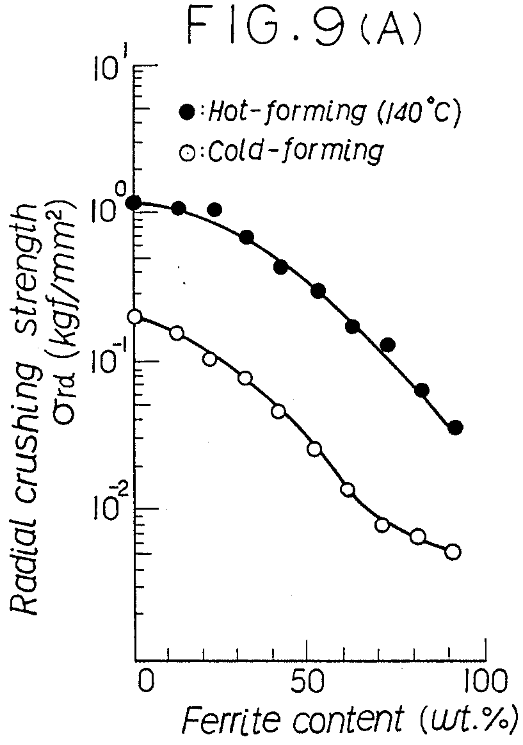
FIG. 9 graphically shows, at (A) and (B), the relationship among the strength and density of compacts and the mixing percentage of ferrite content, proving the preferableness of hot-forming to cold-forming.
Figure 9B:
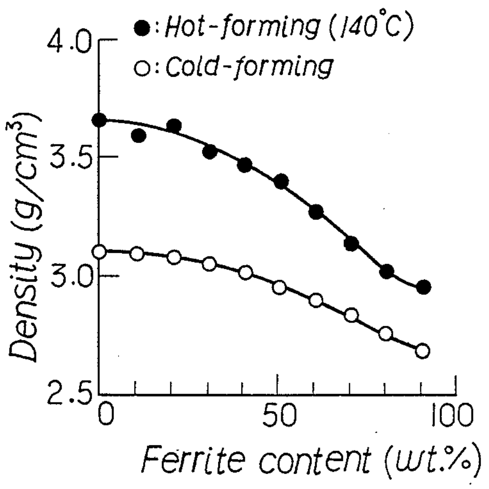

The powders of superplastic Zn-22Al alloy, ferrite and plastic were mixed as shown in Table 8. While the percentage of the plastic powder was fixed at 10 percent by weight, the percentage of the powders of superplastic Zn-22Al alloy and ferrite were varied. Hot-forming was done at a constant temperature of 140° C. under a constant pressure of 10 kgf/mm$^2$. Some compacts were also cold-formed for the purpose of comparison. The strength of the formed compacts was measured by the radial crushing test according to JIS A1113 (testing conditions: temperature=room temperature, and testing speed=5 mm/min). The results are shown at (A) in FIG. 9. The density of the obtained compacts are shown at (B) in FIG. 9. The compacts formed at a temperature of 140° C., at which the thermosetting property of the plastic appears, exhibited higher strength and density, thus proving the advantage of hot-forming over cold-forming.

TABLE 8

| | Mixing Ratio (Percent by Weight) | | | |
|---|---|---|---|---|
| No. | Powder of Superplastic Zn—22Al Alloy (SP) | Powder of Ferrite (FP) | Powder of Plastic (PP) | $\frac{FP}{SP + FP + PP} \times 100\%$ |
| 1 | 0 wt. % | 90 wt. % | 10 wt. % | 80% |
| 2 | 10 | 80 | 10 | 80 |
| 3 | 20 | 70 | 10 | 70 |
| 4 | 30 | 60 | 10 | 60 |
| 5 | 40 | 50 | 10 | 50 |
| 6 | 50 | 40 | 10 | 40 |
| 7 | 60 | 30 | 10 | 30 |
| 8 | 70 | 20 | 10 | 20 |
| 9 | 80 | 10 | 10 | 10 |
| 10 | 90 | 0 | 10 | 0 |

EXAMPLE 8

Figure 10:
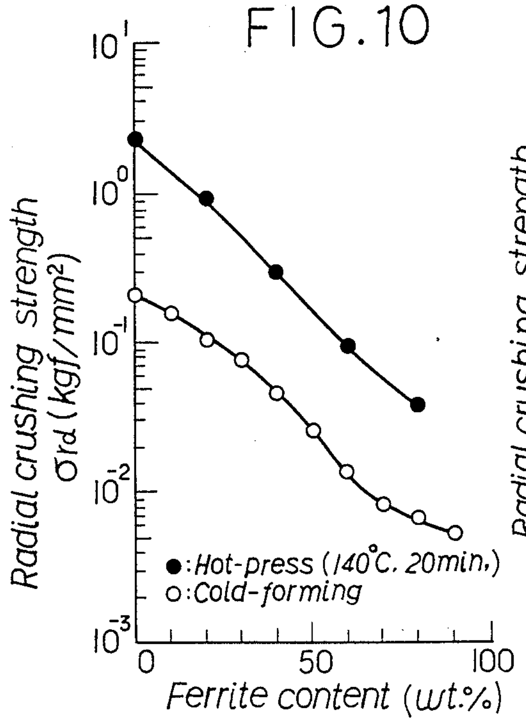
FIGS. 10 to 14 graphically show the relationship between the strength of compacts and the mixing percentage of ferrite content.

As in Example 7, the mixing ratio of the plastic powder and the forming pressure were fixed at 10 percent by weight and 10 kgf/mm$^2$, respectively. Then hot-pressing was carried out at a temperature of 140° C. for a period of 20 minutes. The strength of the formed compacts measured by the same method as that used in Example 7 is shown in FIG. 10. For the purpose of comparison, the results of cold-forming given at (A) of FIG. 9 are shown again. As is obvious from FIG. 10, hot-pressing is very effective in increasing the strength of compacts, as with the hot-forming shown in Example 7.

EXAMPLE 9

Figure 11:
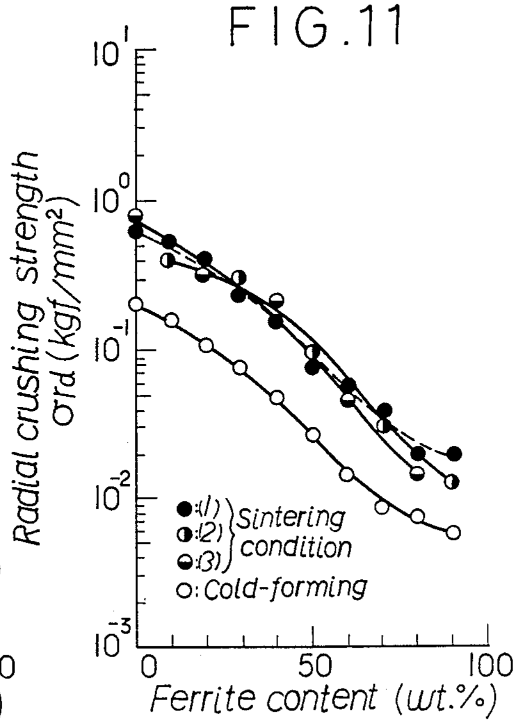

Compacts were cold-formed by fixing the mixing percentage of the plastic powder and forming pressure at 10 percent by weight and 10 kgf/mm$^2$, respectively, as with the compacts for comparison prepared in Example 7. The formed compacts were then fired under three different conditions: (1) in a vacuum at a temperature of 200° C. for a period of 3 minutes; (2) in the atmosphere at a temperature of 150° C. for a period of 30 minutes; and (3) in the atmosphere at a temperature of 250° C. for a period of 30 minutes. The strength of the formed compacts and some cold-formed ones made for the purpose of comparison are shown in FIG. 11. Effectiveness of firing after cold-forming is obvious though the strength is not as high as that obtained from the hot-forming in Example 7 and hot-pressing in Example 8.

EXAMPLE 10

Figure 12:
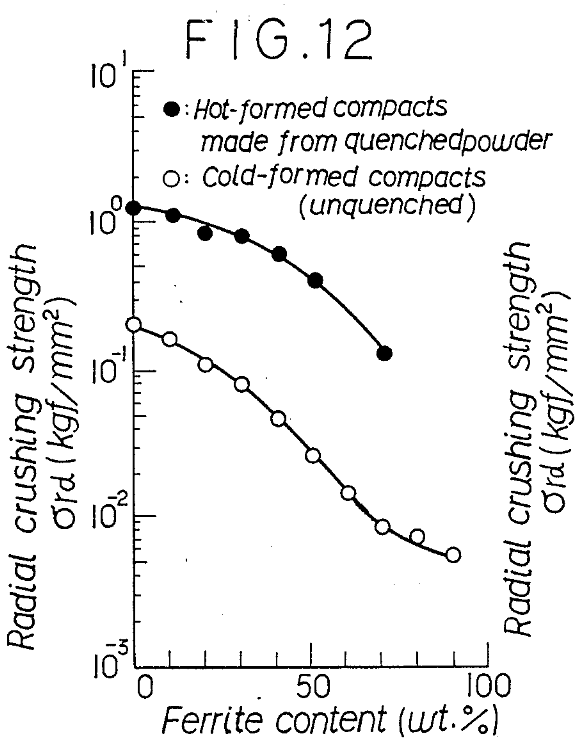

The powder of superplastic Zn-22Al alloy used in this example was heated at 380° C. for 30 minutes and then quenched in iced water. The mixing percentage of the plastic powder and forming pressure were fixed at 10 percent by weight and 10 kgf/mm$^2$, as in Examples 7 to 9. The strength of the compacts made by applying hot-forming at a temperature of 140° C. is shown in FIG. 12. Effectiveness of quenching is obvious, as compared with the cold-formed compacts prepared for the purpose of comparison using an unquenched powder (as with the case of cold-forming shown at (A) of FIG. 9).

EXAMPLE 11

Figure 13:
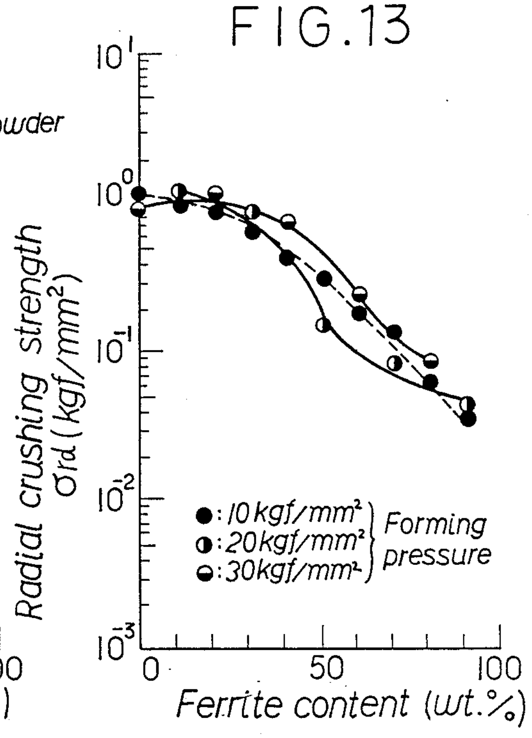

In the Examples 7 to 10, the forming pressure was fixed at 10 kgf/mm$^2$. In this example, hot-forming was performed under three different pressures, i.e., 10, 20 and 30 kgf/mm$^2$. The powder of superplastic Zn-22Al alloy was not quenched, the mixing percentage of the plastic powder was 10 percent by weight, and the forming temperature was 140° C. As is shown in FIG. 13, the strength of the compacts formed under pressures of 10 to 30 kgf/mm$^2$ varied little. This suggests that hot-forming can satisfactorily be achieved under a pressure of not more than about 10 kgf/mm$^2$.

EXAMPLE 12

Figure 14:
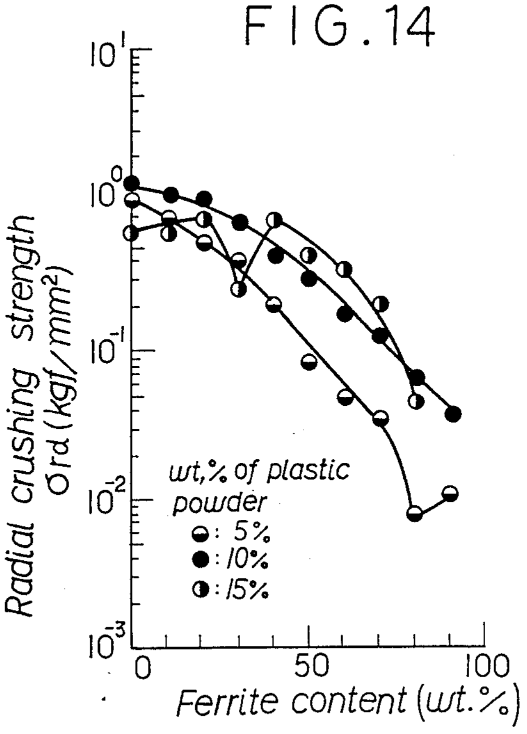

In Examples 7 to 11, the mixing percentage of the plastic powder was fixed at 10 percent by weight. In this example, the strength of the compacts made from mixtures containing 5 percent by weight and 15 percent by weight of the plastic powder, as shown in Tables 9 and 10, was also investigated. While the forming pressure and temperature were fixed at 10 kgf/mm$^2$ and 140° C., respectively, the powder of superplastic Zn-22Al alloy was not quenched. The results of the strength test are shown in FIG. 14. As is obvious, the strength was lower when the mixing percentage of the plastic powder was 5 percent by weight than in the cases in which the mixing percentage stood at 10 percent by weight and 15 percent by weight. Accordingly, the appropriate mixing percentage of the plastic powder is considered to be about 10 percent by weight.

TABLE 9

| | Mixing Ratio (Percent by Weight) | | | |
|---|---|---|---|---|
| No. | Powder of Superplastic Zn-22Al Alloy (SP) | Powder of Ferrite (FP) | Powder of Plastic (PP) | $\frac{FP}{SP + FP + PP} \times 100\%$ |
| 1 | 5 wt. % | 90 wt. % | 5 wt. % | 90% |
| 2 | 15 | 80 | 5 | 80 |
| 3 | 25 | 70 | 5 | 70 |
| 4 | 35 | 60 | 5 | 60 |
| 5 | 45 | 50 | 5 | 50 |
| 6 | 55 | 40 | 5 | 40 |
| 7 | 65 | 30 | 5 | 30 |
| 8 | 75 | 20 | 5 | 20 |
| 9 | 85 | 10 | 5 | 10 |
| 10 | 95 | 0 | 5 | 0 |

TABLE 10

| | Mixing Ratio (Percent by Weight) | | | |
|---|---|---|---|---|
| No. | Powder of Superplastic Zn—22Al Alloy (SP) | Powder of Ferrite (FP) | Powder of Plastic (PP) | $\frac{FP}{SP + FP + PP} \times 100\%$ |
| 1 | 5 wt. % | 80 wt. % | 15 wt. % | 80% |
| 2 | 15 | 70 | 15 | 70 |
| 3 | 25 | 60 | 15 | 60 |
| 4 | 35 | 50 | 15 | 50 |
| 5 | 45 | 40 | 15 | 40 |
| 6 | 55 | 30 | 15 | 30 |
| 7 | 65 | 20 | 15 | 20 |
| 8 | 75 | 10 | 15 | 10 |
| 9 | 85 | 0 | 15 | 0 |

What is claimed is:

1. A composite magnetic compact made by forming into shape a powder mixture consisting essentially of 1 to 50 percent by weight of a powder of a ferromagnetic substance and the remains consisting essentially of a superplastic Zn-22Al alloy powder.

2. A composite magnetic compact according to claim 1, wherein said forming into shape is performed at a temperature of from room temperature to 250° C. and at a pressure of from 3 to 60 kgf/mm$^2$.

3. A composite magnetic compact according to claim 1, wherein said forming into shape comprises hot pressing at a temperature of from 200° C. to 250° C. and a pressure of from 1 to 10 kgf/mm$^2$ for a period of time of from 10 to 60 minutes.

4. A composite magnetic compact according to claim 1, wherein said ferromagnetic substance is ferrite.

5. A composite magnetic compact made by forming into shape a superplastic Zn-22Al alloy powder about a central core of one member selected from the group consisting of a casting bulk of a ferromagnetic substance and a second powder of a ferromagnetic substance, wherein said central core is completely embedded in said magnetic compact.

6. A composite magnetic compact made by forming into shape a powder mixture consisting essentially of 1 to 50% by weight of a powder of a ferromagnetic substance and the remainder consisting essentially of a superplastic Zn-22Al alloy powder, wherein said powder mixture is formed into a shape about a central core of one member selected from the group consisting of a casting bulk of a ferromagnetic substance and a second powder of a ferromagnetic substance, wherein said central core is completely embedded in said magnetic compact.

7. A composite magnetic compact made by forming into shape a powder mixture consisting essentially of 1 to 50% by weight of a powder of a ferromagnetic substance, from 1 to 15% by weight of a powder of a plastic resin, and the remainder consisting essentially of a superplastic Zn-22Al alloy powder.

8. A composite magnetic compact according to claim 1 or 7, in which the powder of superplastic Zn-22Al alloy is quenched after being heated at a temperature of 380° C. for a period of 30 minutes.

9. A composite magnetic compact according to claim 7, wherein said plastic resin is one member selected from the group consisting of phenol resins, epoxy resins, unsaturated polyester resins, and polyurethane resins.

* * * * *